United States Patent
Kruger

(10) Patent No.: US 6,560,914 B2
(45) Date of Patent: *May 13, 2003

(54) FISHING LURE WITH LIFE-LIKE SWIMMING ACTION

(76) Inventor: C. Baxter Kruger, 401 Woodlands Cir., Brandon, MS (US) 39047

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/552,689

(22) Filed: Apr. 19, 2000

(65) Prior Publication Data

US 2002/0144451 A1 Oct. 10, 2002

Related U.S. Application Data

(60) Provisional application No. 60/129,882, filed on Apr. 19, 1999.

(51) Int. Cl.[7] ................................................. A01K 85/00
(52) U.S. Cl. .......................................... 43/42; 43/42.03
(58) Field of Search ....................... 43/42, 42.15, 42.02, 43/42.03, 17.4, 4; D22/126; 446/153, 268

(56) References Cited

U.S. PATENT DOCUMENTS

| | | |
|---|---|---|
| 586,620 A | 7/1897 | Osborn |
| 865,683 A | 9/1907 | Credlebaugh |
| 963,202 A | 7/1910 | Bohannan |
| 981,454 A | 1/1911 | Miller |
| 1,390,601 A | 9/1921 | Caldwell |
| 1,459,042 A * | 6/1923 | Wrege |
| 1,568,325 A | 1/1926 | Dewey |
| 1,786,568 A * | 12/1930 | Kutz |
| 1,881,823 A | 10/1932 | McKenzie |
| 1,967,692 A | 7/1934 | Walker |
| 2,189,487 A | 2/1940 | Davenport |
| 2,219,225 A | 10/1940 | Gambill |
| 2,254,949 A | 9/1941 | Messacar |
| 2,317,781 A | 4/1943 | Lehto |
| 2,515,591 A | 7/1950 | Clink |
| 2,583,942 A | 1/1952 | Harvey |
| 2,619,762 A | 12/1952 | Summitt |
| 2,627,135 A | 2/1953 | Franklin |
| 2,685,145 A * | 8/1954 | Dean .......................... 43/42.11 |

(List continued on next page.)

FOREIGN PATENT DOCUMENTS

| | | | |
|---|---|---|---|
| FR | 727405 | * | 6/1932 |
| GB | 393514 | * | 6/1933 |

OTHER PUBLICATIONS

Bass Pro Shops Catalog, Springfield, MO, 1993, p. 64, bait E, Ozark Mountain Woodwalker.*
Cabela's Catalog, 1992, p. 60, bait 228.*

Primary Examiner—Peter M. Poon
Assistant Examiner—Andrea M. Valenti
(74) Attorney, Agent, or Firm—Nixon & Vanderhye P.C.

(57) ABSTRACT

A lipless fishing lure is particularly constructed to effect a side-to-side swimming action and a life-like appearance. The lure is jointed at its midsection to enhance the life-like swimming action. The body section of the lure includes a throat section that shifts the water impact point as the lure is pulled trough the water to a bottom portion of the lure, causing the lure to swim in a side-to-side motion. The lure can be retrieved steadily as a swimming lure or fished with a swim and stop action as a finesses bait, or twitched erratically as a wounded bait fish.

16 Claims, 3 Drawing Sheets

U.S. PATENT DOCUMENTS

| | | | |
|---|---|---|---|
| 2,691,235 A | | 10/1954 | Pcola |
| 2,728,160 A | | 12/1955 | Franklin |
| 2,996,826 A | | 8/1961 | Lamar |
| 3,191,336 A | * | 6/1965 | Cordell, Jr. |
| 3,504,454 A | * | 4/1970 | Turneville et al. |
| 3,654,724 A | | 4/1972 | Charron |
| 3,959,060 A | | 5/1976 | Jones |
| 3,979,853 A | | 9/1976 | Storm et al. |
| 4,098,017 A | | 7/1978 | Hall |
| 4,242,788 A | * | 1/1981 | McGahee ................. 29/426.6 |
| 4,464,857 A | | 8/1984 | Olszewski |
| 4,637,159 A | | 1/1987 | Kulis |
| 4,831,764 A | * | 5/1989 | Jecevicus ................... 43/42.25 |
| 4,862,631 A | * | 9/1989 | Wilson et al. ............. 43/42.33 |
| 4,873,782 A | | 10/1989 | Gudermuth, Jr. |
| 4,959,920 A | | 10/1990 | Walker |
| 5,084,996 A | | 2/1992 | Woodruff et al. |
| 5,381,620 A | | 1/1995 | Gibbs |
| 5,477,634 A | * | 12/1995 | Welcome ................... 43/42.48 |
| 5,522,170 A | * | 6/1996 | Cole ........................ 43/42.53 |
| 5,561,938 A | | 10/1996 | Kato et al. |
| 5,946,848 A | * | 9/1999 | Ysteboe et al. |

* cited by examiner

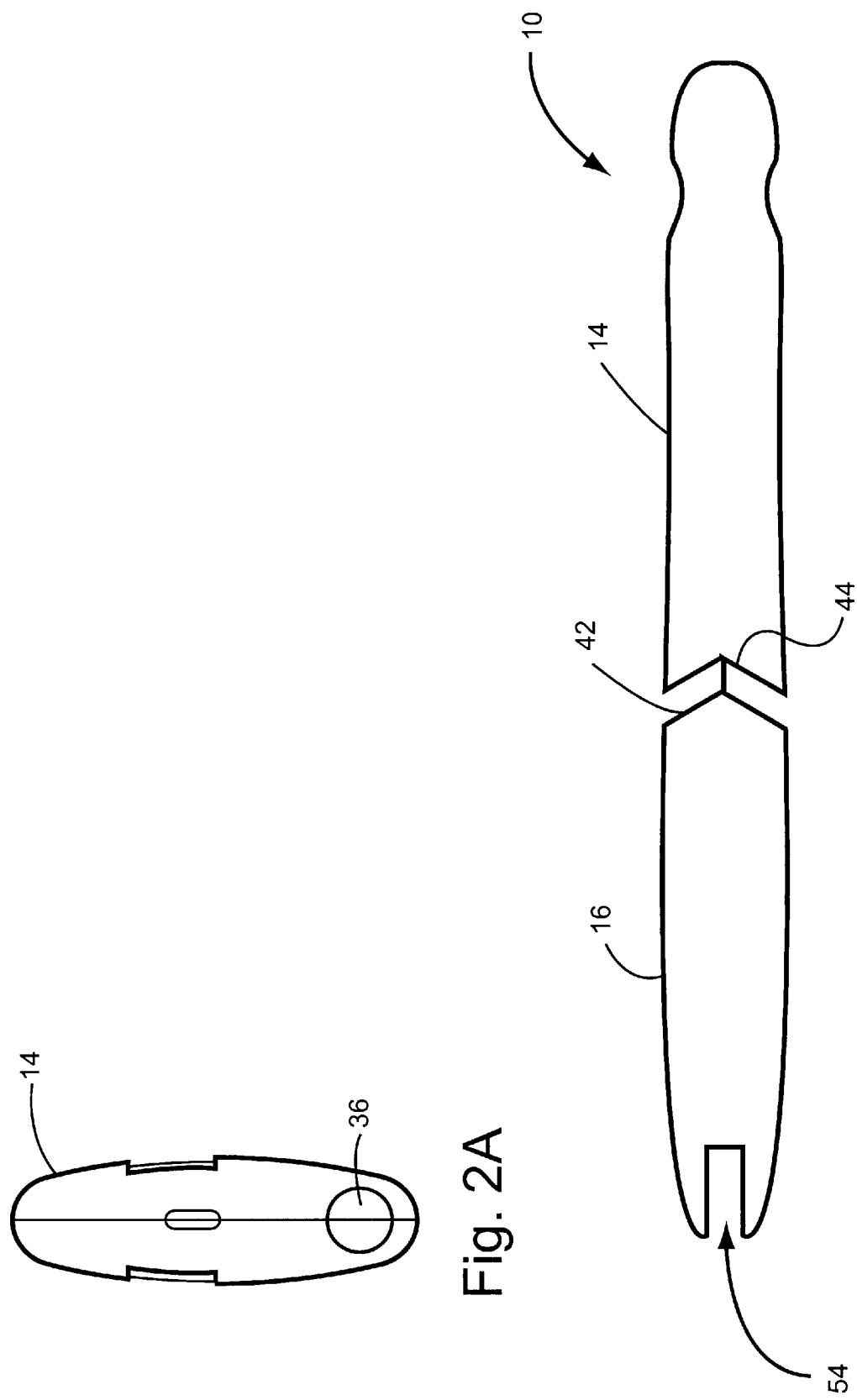

FISHING LURE WITH LIFE-LIKE SWIMMING ACTION

This application claims the benefit of U.S. Provisional Application Ser. No. 60/129,882, filed Apr. 19, 1999, the entire content of which is herein incorporated by reference.

BACKGROUND OF THE INVENTION

The present invention relates to fishing lures and, more particularly, to a particularly shaped lipless fishing lure having life-like swimming action.

In designing a fishing lure, it is desirable for the lure to simulate a live bait fish in appearance and swimming action. There currently exists numerous fishing lures with a body separated into at least two parts connected by a joint, enabling the parts of the body to pivot relative to each other. The construction of the lures, however, produces only a moderate imitation of the natural side-to-side swimming action of a live bait fish, and without proper weighting, conventional lures tend to lay on their side or turn over in the water. None of the conventional constructions is shaped to effectively use hydrodynamic forces (i.e., forces of the water on the lure as the lure is pulled through the water) to effect a life-like swimming action. Moreover, the conventional constructions include an angled lip or the like that is used to maintain the lure's attitude during use. This lip, however, detracts from the appearance of the lure, thereby reducing the lure's effectiveness.

SUMMARY OF THE INVENTION

According to the present invention, a fishing lure that is life-like in appearance and swimming action is provided. The lure is particularly shaped to use hydrodynamic forces to effect the life-like side-to-side swimming action of a live bait fish. Additionally, the lure is jointed at its midsection and is without a lip to better enhance the swimming action and appearance.

In accordance with a preferred embodiment of the invention, a lipless fishing lure includes a tail section, and a lipless head section pivotally hinged to the tail section. The head section is shaped such that hydrodynamic forces generated when moving through the water cause the head section to lift and shift an impact point of the water to a bottom of the lure thereby causing the head section to wobble side-to-side. The head section includes a top portion and a bottom portion shaped in converging arcs and meeting at a mouth portion. The bottom portion preferably includes a throat section that is curved in a direction opposite from the converging arc of the bottom portion. The top portion of the lure may be rounded, and the top portion and the bottom portion may be tapered wider from outside to inside.

The tail section preferably includes a slot and a plurality of nylon strands that are bound and shaped to fit in the slot. A swivel joint is secured between the head section and the tail section. One of the head section and the tail section defines a convex end of the swivel joint, and the other of the head section and the tail section defines a concave end of the swivel joint, facing the convex end. This construction enables the head section and the tail section to pivot relative to each other by an amount corresponding to the facing convex and concave ends.

The head section and the tail section may be formed of an injection molded plastic material, such as ABS polycarbonate. In another arrangement, the head section and the tail section are formed of hand-carved wood, such as cedar.

In accordance with another exemplary embodiment of the invention, a fishing lure includes a tail section that simulates a fish tail, and a head section without a lip pivotally attached to the tail section. The head section includes a top portion and a bottom portion converging at a mouth portion, wherein the bottom portion includes a throat area that is curved substantially corresponding to the top portion.

In accordance with yet another aspect of the invention, a method of manufacturing a lure includes the steps of providing a tail section that simulates a fish tail, providing a head section without a lip and including a top portion and a bottom portion converging at a mouth portion, wherein the bottom portion includes a throat area that is curved substantially corresponding to the top portion, and pivotally attaching the head section to the tail section.

BRIEF DESCRIPTION OF THE DRAWINGS

These and other aspects and advantages of the present invention will be described in detail with reference to the accompanying drawings, in which:

FIG. 2A is a cross-sectional view along the line A–A' in FIG. 2; and

FIG. 3 is a top plan view of the assembled fishing lure.

DETAILED DESCRIPTION OF PREFERRED EMBODIMENTS

Figure 1:
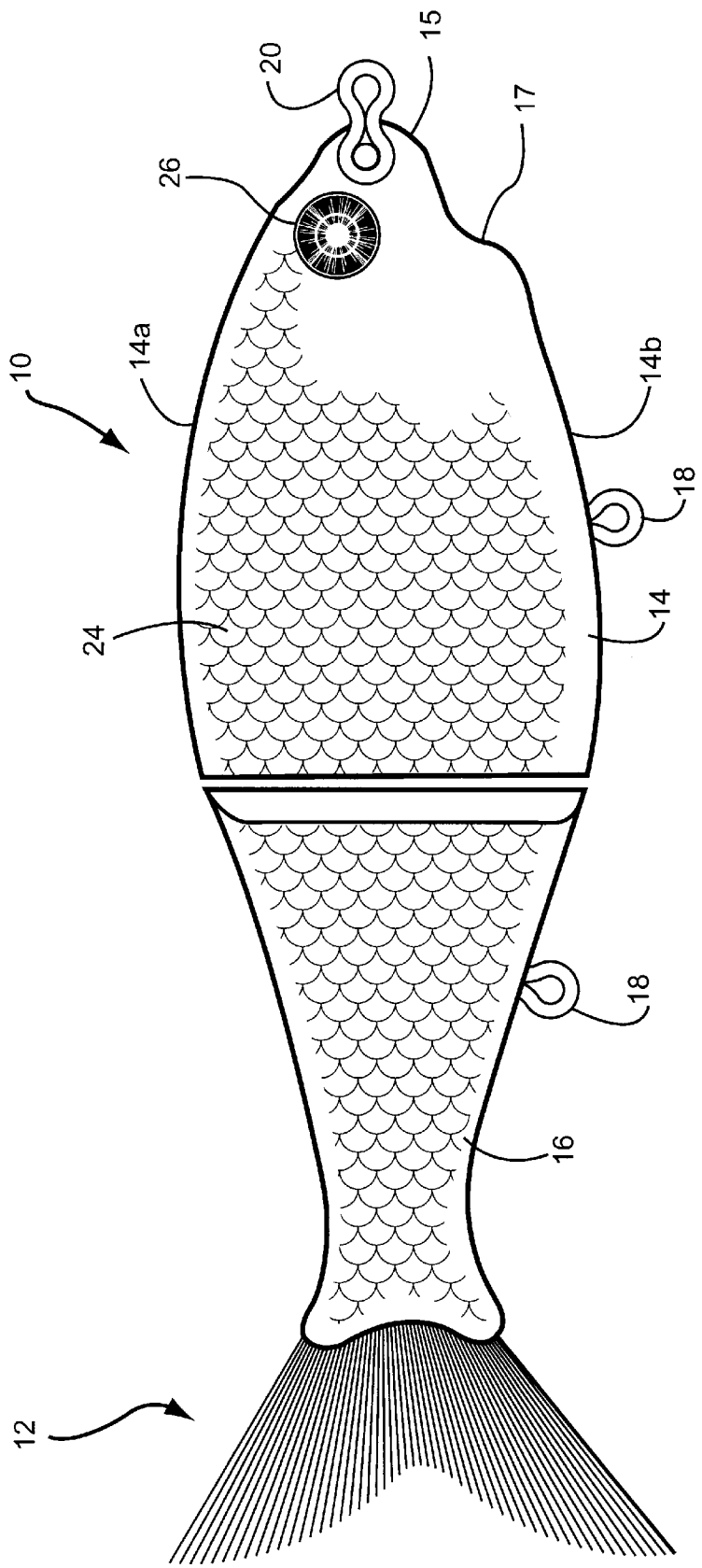
FIG. 1 is a side view of the fishing lure according to the present invention.

An exemplary fishing lure 10 according to the present invention is illustrated in FIG. 1. The fishing lure in FIG. 1 is an exemplary design intended to match the shape and appearance of a gizzard shad (*Dorosoma Cepedianum*). Of course, those of ordinary skill in the art will contemplate alternative designs for the appearance of the fishing lure, and the invention is not meant to be limited to the illustrated configuration.

Figure 2:
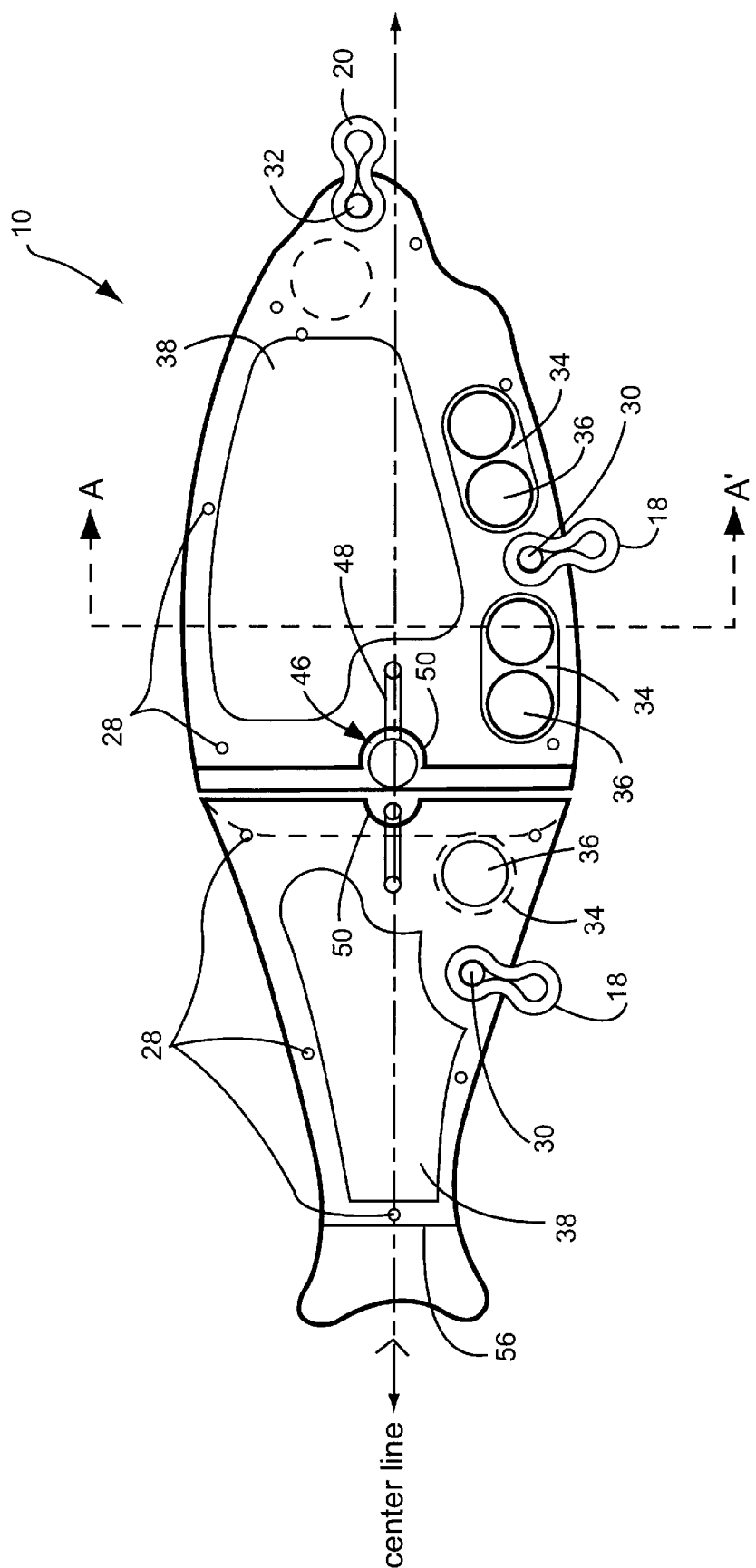
FIG. 2 illustrates a cross-section of the fishing lure illustrated in FIG. 1.

The lure 10 is divided into a head or body section 14 and a tail section 16 that are jointed by a suitable swivel joint (described below). The body section 14 is shaped so that hydrodynamic forces generated when the lure is pulled through water cause the body section 14 to lift and shift the impact point of the water to a bottom of the lure, thereby causing the lure to wobble side-to-side. In particular, the body section 14 includes a top portion 14a and a bottom portion 14b shaped in converging arcs as shown in FIGS. 1 and 2 and meeting at a mouth portion 15. The bottom portion 14a includes a throat section 17 that is curved substantially corresponding to the top portion 14a, i.e., opposite from the bottom portion 14b as shown. The throat section 17 curvature has been exaggerated for ease of illustration. The actual curvature is preferably slightly less for better performance. If the curvature is too steep or too shallow, the lure may tend to lay on its side during use. At least the top portion 14a of the body section 14 is rounded, allowing water to flow over the top of the lure with the least amount of drag. The top portion 14a and the bottom portion 14b are preferably tapered wider from outside to inside, giving the lure a general shape of an American football.

The tail section 16 includes a tail 12 formed using a plurality of bound and shaped micro-fiber nylon strands or hair-like nylon strands, as described in copending U.S. patent application Ser. No. 09/301,326, the entire content of which is hereby incorporated by reference. When assembled without the tail 12, the overall body length, for example, is about 5". One or more hook hangers 18 and a line pull 20 are appropriately secured to the lure 10.

The lure 10 is preferably finished with an iridescent paint sprayed over a highly reflective metal covering and is covered with a heat transferred decal including colors, lines and markings to give the lure a distinctive life-like look. A high-gloss acrylic paint over the decal gives the lure a glossy, wet look. The sides of the lure are textured to a depth of 0.005" by acid etching the mold, giving the lure body the appearance of having scales. The reflective metal covering, iridescent paint, decal, acrylic paint and texture in combination define the finish 24 of the lure. An acrylic or glass eye 26 is secured to each side of the lure 10 with an adhesive or the like.

Depending on the material used for the lure, as an alternative, the lure is provided with a thin base covering of highly reflective aluminum, which is applied by vacuum metalization. An iridescent hue is achieved by the following three specialized steps in the vacuum metalization process. After the aluminum layer is applied, the lure is moved to the second chamber of the vacuum machine. In this chamber, a micro thin layer of silicone ($SIO_2$) is applied over the aluminum. In a third chamber of the vacuum machine, a micro thin layer of titanium ($TIO_2$) is applied over the silicone layer. In the final chamber of the vacuum machine, another micro thin layer of silicone is applied over the titanium layer. The layers of silicone, titanium and silicone with specific thicknesses function together to affect the light reflecting on the aluminum base layer. This specifically controlled interference of the reflecting light creates a unique iridescence, which makes the lure skin appear exceptionally real.

Each section 14, 16 of the lure 10 is formed in two halves (four separate parts total) preferably by injection molding using a polymer material such as ABS or polycarbonate. Other alternative materials can be used to form the lure of the invention using any known means as would be apparent to those of ordinary skill in the art. The lure may alternatively be hand-carved from wood, such as cedar or the like.

Referring to FIG. 2, a cross-section of the lure 10 according to the present invention is illustrated. Each half of each section 14, 16 of the lure is provided with complementary chambers and posts and the like corresponding to its respective other half for containing components of the lure and for effecting assembly of the halves and sections. For example, as shown in FIG. 2, the lure is provided along an internal border thereof with a plurality of alignment posts 28. These posts 28 engage corresponding apertures in the facing opposite halves of the lure. Each section 14, 16 also includes respective hook hanger posts 30, receiving the hook hangers 18, and a line pull post 32, receiving the line pull 20. Corresponding apertures are provided in the opposite halves of the sections 14, 16 for receiving the posts 30, 32 and thereby securing the hook hangers 18 and line pull 20, respectively. The respective parts of the body section 14 and the tail section 16 are solvent welded together to form a union.

As shown, the lure also includes one or more weight chambers 34 for receiving ball bearings 36 or the like that can be customized to effect the swimming action of the lure. That is, using various combinations of weights of ball bearings 36, the lure can be configured to sink, float or suspend as desired. The ball bearings 36 can range from 1/16" to 3/8" in diameter. The lure also includes one or more buoyancy chambers 38 that effect the buoyancy and swimming action of the lure 10. In the molded version, the wall thickness of each section 14, 16 is preferably about 0.1".

In the hand-carved embodiment, two weight chambers are drilled to form hollow chambers in the wood. One is drilled in the body section of the lure, the other is drilled in the tail section of the lure. Both are drilled from the bottom, approximately 1/4 inch from the joint, respectively. The drilled chambers are preferably approximately 3/4 inch long in the front section and 1/2 inch long in the tail section. Both chambers are approximately 3/16 round, using a 3/16 diameter drill bit. The drilled chambers vary in length according to the desired effect, i.e., whether or not the lure is to sink, float or suspend. The drilled chambers are then filled with lead or other meltable heavy metal which has been pre-casted according to the 3/16 diameter of the drilled chamber. These pre-casted inserts are then inserted into the chambers and trimmed and sanded to be flush with the lure body.

With continued reference to FIG. 2 and with reference to FIG. 3, the assembled tail section 16 defines a convex angle 42 at the joint between the body section 14 and tail section 16 of the lure. The assembled body section 14 defines a concave angle 44 substantially corresponding to the convex angle 42 of the tail section 16. The angles 42, 44 at the joint between the body section 14 and tail section 16 of the lure enable the lure to pivot predetermined desired amounts and thereby control the swimming action of the lure. A swivel joint 46 is secured between respective sections 14, 16 of the lure 10 as shown, for example, in FIG. 2. In an exemplary configuration, the swivel joint 46 includes a pair of eyelets 48 mounted in each section 14, 16, respectively at 90° orientation relative to each other. A swivel area for the swivel joint 46 is defined by appropriately shaped cut outs 50 in the lure sections. The eyelets 48 are preferably secured to the respective sections 14, 16 with a 90° bent leg positioned in a corresponding receiving aperture. Of course, those of ordinary skill in the art will contemplate alternatives for the swivel joint according to the invention, and the invention is not meant to be limited to the described and illustrated structure. Indeed, any swivel joint that enables the sections 14, 16 to readily pivot relative to each other could be used.

A tail receiving section or slot 54 is defined by facing stepped areas 56 of the corresponding halves in the tail section 16. The tail receiving section 54 is sized to receive the lure tail 12 as shown in FIG. 1.

With the structural configuration of the lure according to the invention described above, the lure exhibits unique life-like swimming action in use. A number of features of the lure particularly effect the life-like swimming action. On a steady retrieve, the lure will swim from side-to-side from 0 to about 35° to the right, back to 0° and to about 35° to the left. When the lure is simply twitched, it is capable of turning completely around (i.e., 360°). A rapid twitching of the lure makes the lure turn from 0° to about 130° to the right, back to 0° to about 130° to the left. This swimming action gives the lure a highly life-like appearance in use. The structure and configuration of the lure components utilize hydrodynamic forces to effect the life-like swimming action.

From the pull point at the front of the lure to the end of the tail section 16, the top of the lure is rounded and not squared (see FIG. 2A). This allows the water to flow over the top of the lure without creating additional drag. The throat section 17 serves to slightly lift the lure head as the lure is being pulled through the water. Such lift effectively shifts the impact point of the water from the tip of the body section 14 toward the bottom portion 14a of the lure. The cutting edge of the lure thus at the bottom portion 14a, while the lure is being pulled through the water, causes the lure to begin to wobble from side-to-side. As the bottom of the lure wobbles slightly to the right, the natural forces of the water and the overall shape of the lure act to straighten the wobble. This straightening moves the bottom of the lure back toward the center and then to the opposite side until the natural forces act to straighten the wobble back to the center. As the lure is pulled, the cycles of wobble and straightening are repeated.

The location of the joint 46, the beveled design 42, 44 of the sections 14, 16 of the lure coming together at the joint 46, and the joint connectors 48 also serve to effect the smooth swimming action. The joint 46 allows the tail section 16 to move in the opposite direction of the body section 14. When the side-to-side action of the body section 14 is moving to the right, the tail section 16 is moving to the left and vice versa, which makes the lure appear to swim like a live fish.

Additionally, the weighting of the lure with the weights 36 keep the lure balanced. Primarily, the weights make the lure sit properly in the water at a 0° attitude. The top of the lure remains at the top, and the bottom remains at the bottom when the lure is in the water, instead of laying on its side or turning over. Additionally, the weights 36 keep the lure balanced when it is being pulled and drag is being created by the throat section 17. Without the weights, the throat section 17 may cause the lure to spin or swim on its side. The specific placement of the weights (e.g., two in the body section 14, and one in the tail section 16) counteract the drag so that the action is side-to-side instead of spinning and the lure maintains a proper attitude.

Still further, by the structure of the lure according to the invention, the lure is designed so that it will turn away from the angler up to 360° as it is stopped suddenly, giving the appearance that the lure is turning around to look behind it. This unique turning around action is created by the combination of the life-like swimming action of the lure, stopping of the lure suddenly, and the natural forces of the water operating on the lure and the joint of the lure. As the lure is pulled through the water, it moves from side to side by virtue of the throat section 17. When the lure is stopped suddenly, inertia forces the lure forward. When the lure is stopped and the head section is moving to the right, for example, this inertia forces the head of the lure to move further to the right. The joint 46 of the lure separates the force of inertia into two forces. That is, if the lure broke apart at the joint 46, the force of inertia would push the body section 14 to the right and push the tail section 16 straight. If the lure was not jointed, inertia would force the lure to move forward and veer slightly to the right or left. The joint 46 channels inertia in the body section 14 pushing it forward. When the forward push is combined with the side-to-side action of the lure, it pushes the body section 14 further to the right, for example. As the head of the lure turns and the tail section 16 bends, the large side of the body section 14 of the lure creates additional drag. This drag acts to stop the forward motion of the lure and channel the remaining inertia to the body section 14 to turn it still further.

The joint 46 channels the inertia of the tail section 16 forward. When this is combined with the fact that the tail section 16 is still connected to the body section 14, the effect is to push the back of the body section 14 straight ahead, thus forcing the front of the body section 14 further around to the right. The body section 14 then naturally slows down and stops, and the remaining inertia is transferred to the tail section 16, which is trying to continue its straight momentum. Because the tail section 16 is still connected to the body section 14, the tail section 16 follows the path of the body section 14 around to the right. With this swimming action, the lure according to the invention is extremely versatile. The lure can be cranked steadily as a swimming lure or fished with a swim and stop action as a finesse bait, or twitched erratically as a wounded bait fish.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lipless fishing lure comprising:

a tail section; and a lipless head section pivotally hinged to the tail section, wherein the head section is shaped such that hydrodynamic forces generated when moving through water cause the head section to lift and shift an impact point of the water to a bottom of the lure thereby causing the head section to wobble side-to-side, the head section comprising a top portion and a bottom portion shaped in converging arcs and meeting at a mouth portion, the bottom portion including a throat section having an external perimeter outline when viewed from a side of the lure that is curved in a direction opposite from the converging arc of the bottom portion, wherein the tail section and the head section are structurally configured such that when the lure is twitched in the water, the lure turns up to 360° and on a steady retrieve, the lure swims side to side.

2. A lipless fishing lure according to claim 1, wherein the top portion is rounded.

3. A lipless fishing lure according to claim 2, wherein the top portion and the bottom portion are tapered wider from outside to inside.

4. A lipless fishing lure according to claim 1, wherein the tail section comprises a slot and a plurality of nylon strands that are bound and shaped to fit in the slot.

5. A lipless fishing lure according to claim 1, further comprising a swivel joint secured between the head section and the tail section.

6. A lipless fishing lure according to claim 5, wherein one of the head section and the tail section defines a convex end at the swivel joint, and wherein the other of the head section and the tail section defines a concave end at the swivel joint, facing the convex end, thereby enabling the head section and the tail section to pivot relative to each other by an amount corresponding to the facing convex and concave ends.

7. A lipless fishing lure according to claim 1, wherein the head section and the tail section are formed of an injection molded plastic material.

8. A lipless fishing lure according to claim 7, wherein the plastic material is ABS polycarbonate.

9. A lipless fishing lure according to claim 1, wherein the head section and the tail section are formed of hand-carved wood.

10. A lipless fishing lure according to claim 9, wherein the hand-carved wood is cedar.

11. A fishing lure comprising:

a tail section that simulates a fish tail; and a head section without a lip pivotally attached to the tail section, the head section including a top portion curving in a first direction and a bottom portion curving in a second direction converging at a mouth portion, wherein the bottom portion includes a throat area having an external perimeter outline when viewed from a side of the lure that is curved in the first direction, opposite from the second direction wherein the tail section and the head section are structurally configured such that when the lure is twitched in the water, the lure turns up to 360° and on a steady retrieve, the lure swims side to side.

12. A fishing lure according to claim 11, wherein the top portion is rounded.

13. A fishing lure according to claim 11, further comprising a swivel joint secured between the head section and the tail section.

14. A fishing lure according to claim 12, wherein the top portion and the bottom portion are tapered wider from outside to inside.

15. A lipless fishing lure according to claim 13, wherein one of the head section and the tail section defines a convex end at the swivel joint, and wherein the other of the head section and the tail section defines a concave end at the swivel joint, facing the convex end, thereby enabling the head section and the tail section to pivot relative to each other by an amount corresponding to the facing convex and concave ends.

16. A method of manufacturing a fishing lure, comprising:

providing a tail section that simulates a fish tail;

providing a head section without a lip and including a top portion curving in a first direction and a bottom portion curving in a second direction converging at a mouth portion, wherein the bottom portion includes a throat area having an external perimeter outline when viewed from a side of the lure that is curved in the first direction, opposite from the second direction;

pivotally attaching the head section to the tail section; and structurally configuring the tail section and the head section such that when the lure is twitched in the water, the lure turns up to 360° and on a steady retrieve, the lure swims side to side.

* * * * *